Patented Jan. 12, 1937

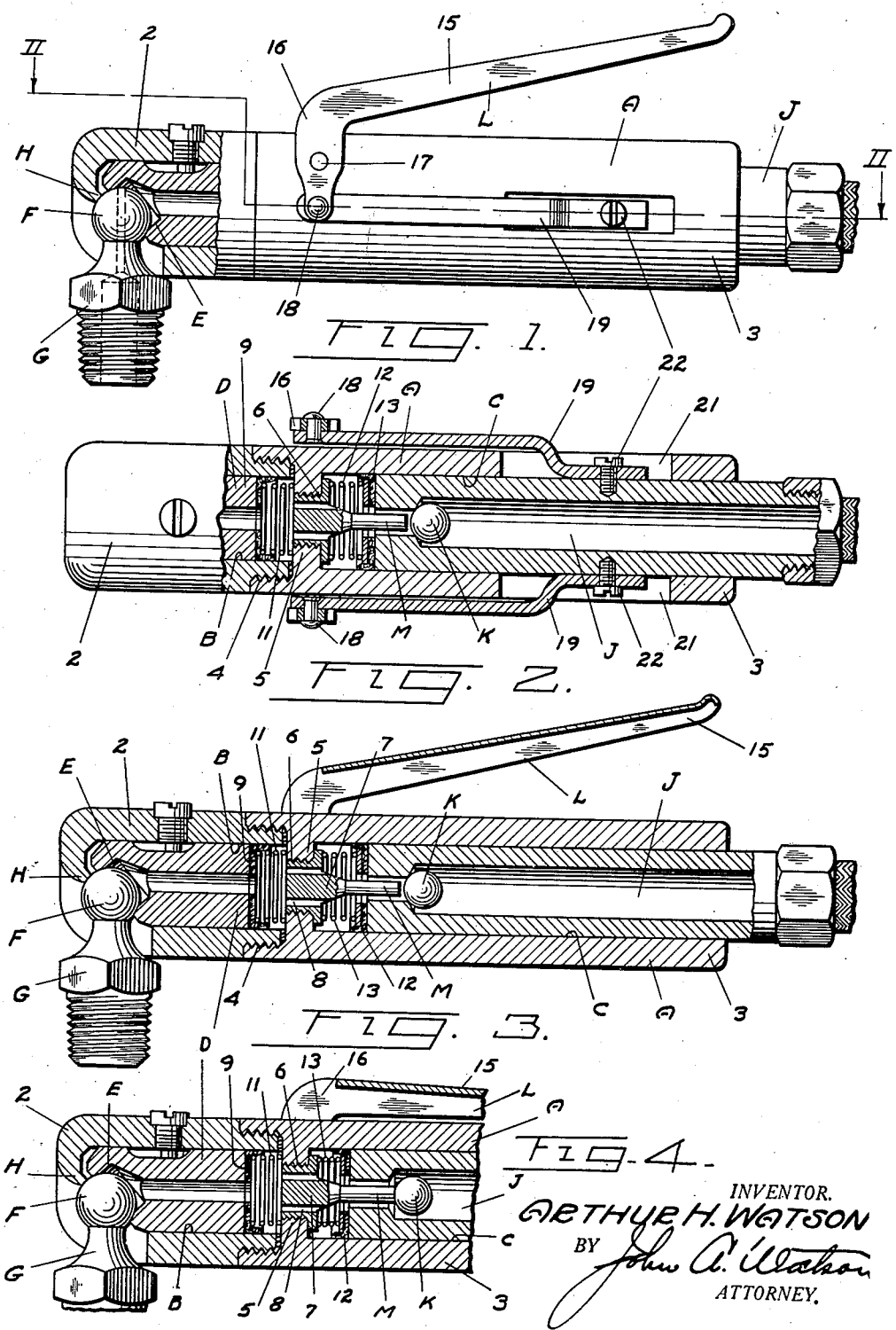

2,067,298

UNITED STATES PATENT OFFICE 2,067,298

LUBRICATING DEVICE

Arthur H. Watson, Wilmette, Ill., assignor to The Lubrication Corporation, Chicago, Ill., a corporation of Delaware Application December 30, 1932, Serial No. 649,461

7 Claims. (Cl. 221—47.4)

This invention relates to improvements in lubricating devices and more particularly lubricant discharge nozzles of the lubricant pressure operated clamp type.

Heretofore many types of discharge nozzles have been employed in the lubricating art having the feature of clamping engagement with a lubricant receiving fitting under forces applied through the medium of the pressure under which the lubricant is discharged through the nozzle. This type of nozzle is particularly useful where lubricant under varying pressures as well as very high pressure is to be discharged into the lubricant receiving fitting, inasmuch as the clamping engagement of the nozzle with the fitting, and hence the pressure applied in effecting a lubricant tight seal therewith, may at all times be in proportion to the lubricant pressure to which the seal is subjected. Frequently, however, during the servicing operation the pressure operated clamp nozzle becomes locked upon the fitting due in many cases to the resistance to the passage of the lubricant through the fitting or through the various canals and crevices of the bearing with which the fitting is associated thereby necessitating the use of a manually operated relief valve somewhere in the lubricant feed line between the lubricant pressure pump or lubricant source and the pressure operated clamping mechanism of the nozzle. Where a relief valve is so employed the lubricant bled through the valve during the relieving of pressure within the supply line is usually wasted. Furthermore, the use of a relief valve entails the additional manual operation of a shutoff valve between the pump and that portion of the line containing the relief valve, otherwise the pressure within the line may not be sufficiently reduced to permit of removal of the nozzle.

An object of this invention is to provide a pressure operated clamp discharge nozzle incorporating clamping mechanism for clamping the nozzle upon the head of lubricant receiving fitting, a shutoff valve and automatic means for relieving the lubricant pressure applied to the clamping mechanism at the end of each servicing operation.

Another object is to provide a discharge nozzle of the clamp type as described wherein lubricant pressure applied to operate the clamping mechanism of the nozzle is automatically relieved at the end of the servicing operation without entailing the loss of lubricant.

A further object is to provide a lubricant discharge nozzle as described wherein the instrumentality for manually controlling the shutoff valve and the automatic pressure release consists of a single member conveniently placed along the stock of the nozzle, thus necessitating the employment of but one hand of the operator during the complete servicing operation.

Another object is to provide a lubricant discharge nozzle wherein the pressure at the discharge orifice of the nozzle is automatically reduced at the time the nozzle is detached from the fitting, thereby preventing the extrusion of lubricant through the discharge nozzle to besmear the adjacent parts thereof.

Other objects, the advantages, and uses of the invention, will be or should become apparent after reading the following description and claims and after consideration of the accompanying drawing forming a part of this specification, in which:

Fig. 1 is a side elevation, with a portion thereof broken away, of a lubricant discharge nozzle constructed in accordance with the invention;

Fig. 2 is a sectional view along the line II—II in Fig. 1;

Fig. 3 is a vertical sectional view of the nozzle as shown in Fig. 1;

Fig. 4 is a fragmentary sectional view of the discharge nozzle during its discharge function.

In general, the clamp type lubricant discharge nozzle selected for illustration herein comprises a substantially tubular body A providing aligned cylinders B and C in the forward and rearward portions thereof, a tubular plunger D slidably mounted within the cylinder B having a discharge orifice E at its forward end for registration with the spherical head F of a lubricant receiving fitting G, a clamping jaw H formed at the forward end of the body A whereby the head F may be clamped between the plunger D and the jaw H when the plunger is subjected to lubricant pressure within the cylinder B, a conduit J slidably mounted within the cylinder C, a valve K within the bore of the conduit, manually operated means L for urging the conduit J forwardly in the cylinder C, and a valve operating pin M fixed within the cylinder C for opening the valve K when the conduit is urged forwardly within the cylinder C.

The body A may comprise a pair of aligned, substantially tubular members 2 and 3 jointed to one another by cooperating screw threads 4, the forward end of the member 3 being provided with a partition wall 5 having an internally threaded bore 6 therethrough within which the externally threaded base 7 of the pin M is received. Passageways 8 may be formed through the portion 7 of the pin M so that lubricant may flow from the cylinder C to and within the cylinder B where it is free to flow through the bore of the plunger D, the discharge orifice E and into the fitting G.

The rearward end of the plunger D is provided with a packing ring 9 urged against the rearward face of the plunger by a compression spring 11 which, in addition to holding the packing gland 9 in place, serves to urge the plunger yieldingly toward the jaw H so that initial engagement of the nozzle with the fitting head F may be expedited by a snap-on action between the nozzle and spherical fitting head prior to subjecting the plunger D to lubricant under operating pressure. In like manner the end of the conduit J is provided with a packing ring 12 held in place by a spring 13 which provides the added function of normally urging the conduit J rearwardly of the cylinder C so that the valve K lies clear of engagement with the valve operating pin M.

The mechanism L comprises a hand lever 15 having a bifurcated yoke 16 embracing the outer wall of the body A and pivotally mounted at 17 thereto. The remote ends of the bifurcated portion of the lever are pivotally connected at 18 to a pair of links 19 the remote ends of which extend through diametrically opposed slots through the member 3 and are secured by screws 22 to the opposed side walls of the conduit J. When the lever 15 is moved to the position of Fig. 4 the conduit J, through the links 19, is caused to move forwardly in the cylinder C until the valve K, which may be of the steel ball type, is arrested against further movement by contacting with the pin M thereby opening to admit lubricant under operating pressure from the conduit into the cylinder C where it may flow through the passageways 8 into the cylinder B to operate the clamp plunger D and to seek its way through the plunger into the head F of the fitting G. During this function of the nozzle the volume of the space in the cylinder C forwardly of the packing 12 of the conduit J will become reduced.

When sufficient lubricant has been admitted to the fitting to satisfy the demands thereof, the operator may release the lever 15 by expanding his grip upon the lever and body A whereupon the lubricant pressure within the cylinder C together with the force of the compression spring 13 will act to urge the conduit J rearwardly until the valve K again closes the passageway of the conduit J. At this time lubricant under operating pressure is completely shut off from the nozzle and by very slight continued rearward movement of the conduit J under pressure of lubricant within the cylinder C and on the spring 13, will further increase the space within the cylinder C ahead of the conduit until the pressure therein is sufficiently low to permit the ready detachment of the nozzle from the fitting. It is suggested that for the most efficient operation there be at least 1/16 of an inch clearance between the valve K and the pin M when the nozzle is in its normal inoperative position to assure sufficient increase in the volume of the cylinder space to adequately relieve pressure upon the plunger D for the releasing of the nozzle subsequent to the servicing operation.

It may be seen that the nozzle herein described affords in unitary assembly a pressure operated clamp nozzle, a shutoff valve, and automatic means for relieving lubricant pressure applied to the clamping instrumentality to facilitate the quick detachment of the nozzle from the fitting after the servicing operation has been completed. The nozzle may be operated with very little manual effort and by the use of one hand, thereby permitting the operator to use his other hand for any other duties which may be desired. The multiplication of manual force through the lever 15 is such as to prevent the tiring of the operator's hand during the servicing operation in working against the expanding tendency of the space within the cylinder C ahead of the conduit.

It is to be understood that the described embodiments of the invention herewith set forth are presented for purpose of illustration only, and various changes may be made therein without departing from the spirit and scope of the invention.

I claim:

1. In a lubricant discharge nozzle, means providing a cylinder, a lubricant conducting conduit mounted for reciprocation in said cylinder, a valve for controlling the flow of lubricant from the conduit into said cylinder, means providing communication between said cylinder and the discharge orifice of said nozzle, and means for opening said valve when said conduit is urged inwardly of the cylinder to displace lubricant therein.

2. In a lubricant discharge nozzle, means providing a cylinder, a lubricant conducting conduit mounted for reciprocation in said cylinder, a valve for controlling the flow of lubricant from the conduit into said cylinder normally closed by the pressure of lubricant in said conduit, means providing communication between said cylinder and the discharge orifice of said nozzle, and means for opening said valve when said conduit is urged inwardly of the cylinder to displace lubricant therein.

3. A lubricant discharge nozzle comprising, a body providing a cylinder, a lubricant conducting conduit slidably mounted within said cylinder the outer end of which is adapted for connection with a source of lubricant supply, packing between the inner end of the said conduit and the cylinder walls, lubricant pressure responsive means including a member having a discharge orifice for clamping said nozzle upon a lubricant receiving fitting whereby a lubricant tight seal may be established between the discharge orifice and the fitting, means for establishing communication between said cylinder and the lubricant pressure responsive instrumentality of said clamping means, and manually operable means for moving said conduit in said cylinder to vary the lubricant capacity of the cylinder at will.

4. A lubricant discharge nozzle comprising, a body providing a cylinder, a lubricant conducting conduit slidably mounted within said cylinder the outer end of which is adapted for connection with a source of lubricant supply, packing between the inner end of the said conduit and the cylinder walls, lubricant pressure responsive means including a member having a discharge orifice for clamping said nozzle upon a lubricant receiving fitting whereby a lubricant tight seal may be established between the discharge orifice and the fitting, means for establishing communication between said cylinder and the lubricant pressure responsive instrumentality of said clamping means, manually operable means for moving the said conduit in said cylinder to vary the lubricant capacity of the cylinder at will, and a shut-off valve operable to shut off the flow of lubricant through said conduit when the capacity of said cylinder is increased.

5. A lubricant discharge nozzle comprising, a body providing a cylinder, a lubricant conducting conduit slidably mounted within said cylinder the outer end of which is adapted for connection with a source of lubricant supply, packing between the inner end of the said conduit and the cylinder walls, lubricant pressure responsive means including a member having a discharge orifice for clamping said nozzle upon a lubricant receiving fitting whereby a lubricant tight seal may be established between the discharge orifice and the fitting, means for establishing communication between said cylinder and the lubricant pressure responsive instrumentality of said clamping means, manually operable means for moving said conduit in said cylinder to vary the lubricant capacity of the cylinder at will, and a shut-off valve operable to shut off the flow of lubricant through said conduit when the capacity of said cylinder is increased, and to open said valve when the capacity of the cylinder is reduced.

6. A lubricant discharge nozzle comprising, a body providing a cylinder, a lubricant conducting conduit slidably mounted within said cylinder the outer end of which is adapted for connection with a source of lubricant supply, packing between the inner end of the said conduit and the cylinder wall, lubricant pressure responsive means including a member having a discharge orifice for clamping said nozzle upon a lubricant receiving fitting whereby a lubricant tight seal may be established between the discharge orifice and the fitting, means for establishing communication between said cylinder and the lubricant pressure responsive instrumentality of said clamping means, manually operable means for moving said conduit plunger in said cylinder to vary the lubricant capacity of the cylinder at will, and a shut-off valve operable to shut off the flow of lubricant through said conduit when the capacity of said cylinder is increased and to open said valve when the capacity of the cylinder is reduced, said valve being located within the bore of the conduit, the operating means for said valve comprising a stationary pin fixed within said cylinder and extending within the bore of the conduit in the path of the valve when said conduit is shifted longitudinally within the cylinder.

7. In a lubricant discharge nozzle, a body member formed to provide a cylinder at one end, means providing a lubricant discharge orifice located at the opposite end of said body member, said orifice being in communication with said cylinder, a conduit member having the form of a piston plunger mounted on said body member and having one end located within said cylinder to provide a chamber communicating with said discharge orifice and with the bore of said conduit, the remote end of said conduit member being adapted for communication with a source of lubricant supply, a valve located within the bore of said conduit and adapted to be closed by the pressure of the lubricant within said conduit, manually operable means for advancing said conduit member into said cylinder, and means for causing said valve in said conduit bore to open when the conduit member is urged inwardly of the cylinder to contract said chamber formed thereby.

ARTHUR H. WATSON.